235-382 SR
10/6/87 XR 4,698,630

United States Patent [19]

Ellsberg

[11] Patent Number: 4,698,630

[45] Date of Patent: Oct. 6, 1987

[54] SECURITY SYSTEM

[75] Inventor: Thomas R. Ellsberg, Los Angeles, Calif.

[73] Assignee: American Locker Group Incorporated, Jamestown, N.Y.

[21] Appl. No.: 743,911

[22] Filed: Jun. 12, 1985

[51] Int. Cl.[4] .......... G06F 7/04; G07D 7/00; G06K 7/01; G06K 5/00

[52] U.S. Cl. .......... 340/825.31; 340/825.34; 235/382; 235/382.5; 70/79

[58] Field of Search .......... 340/825.3, 825.31, 825.34, 340/825.35, 825.07, 825.22, 825.52; 370/92; 70/277, 278, 282, 79; 364/200, 900; 235/382, 382.5

[56] References Cited

U.S. PATENT DOCUMENTS

| | | | |
|---|---|---|---|
| 3,648,241 | 3/1972 | Naito et al. | 340/825.31 |
| 3,901,057 | 8/1975 | Coley, Sr. | 70/282 |
| 3,969,584 | 7/1976 | Miller et al. | 340/825.31 |
| 4,157,534 | 6/1979 | Schachter | 340/825.31 |
| 4,167,104 | 9/1979 | Bond | 70/282 |
| 4,177,657 | 12/1979 | Aydin | 70/278 |
| 4,204,635 | 5/1980 | Hofmann et al. | 235/382 |
| 4,396,914 | 8/1983 | Aston | 340/825.31 |
| 4,532,507 | 6/1985 | Edson et al. | 340/825.31 |

FOREIGN PATENT DOCUMENTS

| | | | |
|---|---|---|---|
| 2078845 | 1/1982 | United Kingdom | 70/277 |
| 2121223 | 12/1983 | United Kingdom | 370/92 |
| 2125096 | 2/1984 | United Kingdom | 70/277 |

*Primary Examiner*—Ulysses Weldon
*Assistant Examiner*—Ralph E. Smith
*Attorney, Agent, or Firm*—Bean, Kauffman & Bean

[57] ABSTRACT

A security locking system includes a plurality of compartments each having a door giving access thereto and a lock for locking each such door; a console for controlling operation of the locks to permit access to the compartments, wherein the console includes a circuit for accepting a plurality of selected multiple digit codes, each of which codes electronically opens an individual lock associated with that particular selected code; and an additional circuit associated with each lock for allowing all of the locks to be connected by common wiring to the console.

20 Claims, 16 Drawing Figures

END KEY

OPEN

MASTER ROUTINE

CASE I

PROGRAM

FIG. 13
CASE 2
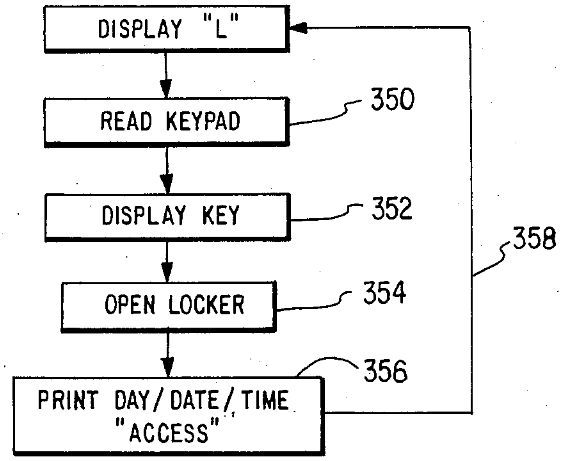
FIG. 14
CASE 3
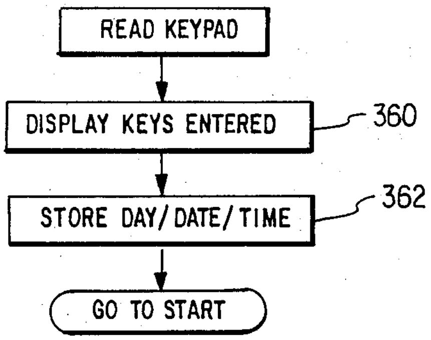
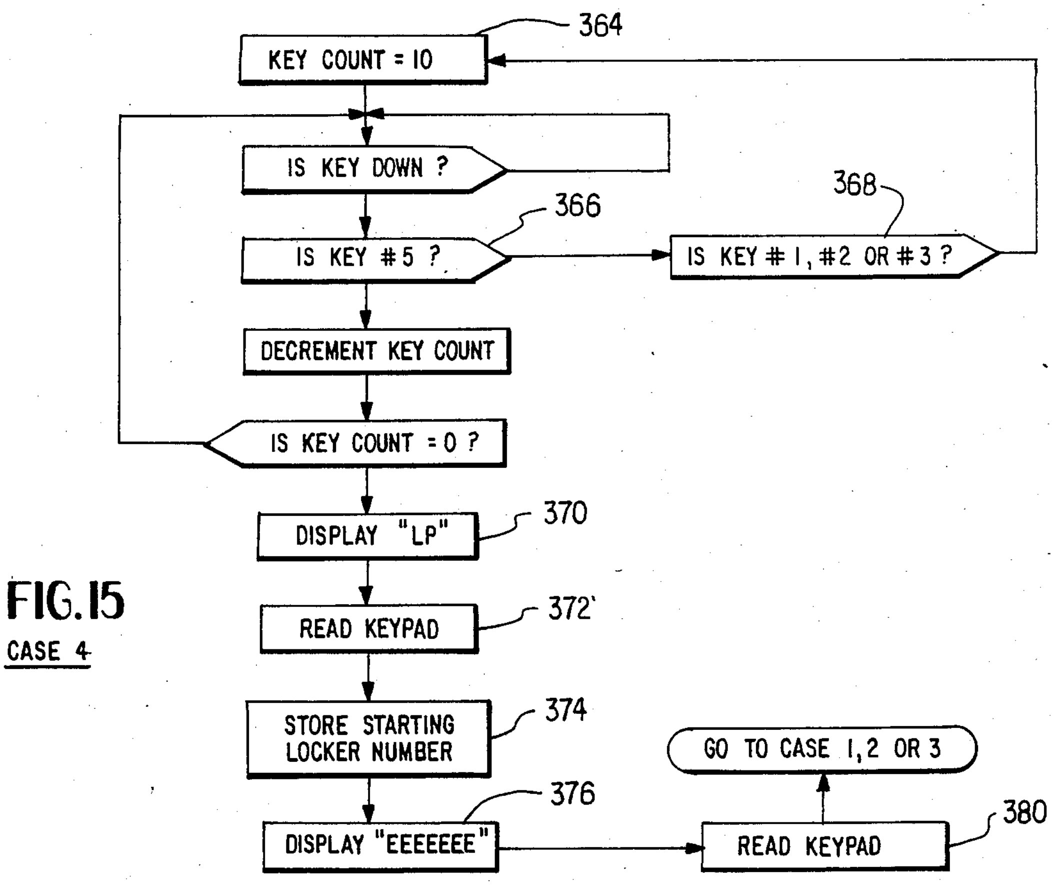
FIG. 15
CASE 4

SECURITY SYSTEM

BACKGROUND OF THE INVENTION

The invention relates to a system for the safe distribution of sensitive information such as, for example, confidential computer printouts. Often, the system is most conveniently provided as a "through the wall" system in which an entire wall is in the form of a bank of compartments or lockers having compartment doors on the access side of the wall through which access to the individual compartments may be had by persons authorized for that access. On the opposite side of the wall, in the security area, doors are also provided so that the sensitive information may be loaded as desired into the appropriate compartments. Loading may be effected either from the front or from the rear but access by a person authorized to gain access to a particular compartment is achieved only from the front. This general type of system is old and well known and the present invention seeks to provide improvements therein.

Background Prior Art

The following U.S. patents are noted: U.S. Pat. Nos. 4,392,133, 4,283,710, 4,218,690, 4,204,635, 4,198,619, 4,157,534, 3,923,134, 3,866,173, 3,846,622, 3,794,813, 3,648,241, 3,515,340.

The above patents relate generally to the subject matter of the present invention in that they relate to security systems which include a console into which a code must be entered to gain access to a restricted region.

Brief Summary of the Invention

Accordingly, this invention is primarily concerned with a system as aforesaid wherein access to the compartments by authorized personnel is achieved electronically, under the control of a processor, through a console having a keyboard into which a multiple digit user code is entered by the person seeking access. The user code entered is displayed so that errors may be avoided and in response to access, an audit trail of the access is provided by a printer contained inside the console. The audit trail printout records the compartment number, date and time each compartment is opened. In addition, a higher level or master code may be used by management, in which case the visual display is some arbitrary sequence which may be a series of letters masking the master code from unauthorized viewing but identifiable to the person entering the master code. The master code is used in association with a special key-controlled switch which causes entry of the master code to branch the access into one or more of a selected series of routines not otherwise available to the lower level user code. Various functions may be performed by the access afforded by the master code, including provision for changing the access user code for any particular compartment.

An object of this invention is to provide access control by a console having a keyboard input to a processing unit, there being provision for gaining access to any locker compartment by means of a multiple digit user code particularly assigned to that locker compartment. A master code allows branched access to certain routines which allow a number of separate operations including assignment of a different user code to a particular locker compartment, direct access to any locker compartment by means of its identity number (not user code number) and access to any locker compartment by means of its assigned user code.

The system includes provision for audit trail printout of relevant information such as the date, time and identity number of the locker compartment which was accessed, and change of user code assignment when applicable, the audit trail being accessible only to those persons possessing the key which unlocks the console.

In order to provide for greater security, access by means of the master code is accomplished only when the key which operates a lock-controlled switching mechanism is also operated.

An important feature of the invention concerns means whereby the physical and electrical systems are greatly simplified. To this end, the lock means for each locker compartment has an additional circuit associated with it which controls the lock means but is addressed by the console circuit, thereby allowing all of the additional circuits to be connected by common wiring. This not only greatly simplifies the original wiring for a bank of locker compartments but also allows additional locker compartments to be wired by simple extension of the wiring.

It is also a feature of this invention that the lock means carries the printed circuit board on which the additional circuit means is provided and that the lock means provides the mounting of this assembly on the locker cabinet.

Another feature of this invention concerns details of the lock means itself, in particular the provision of a lock housing having a receiving bore and an intersecting solenoid plunger bore. The plunger normally projects partially into the receiving bore and because of the angle of intersection of the bores, the end face of the plunger presents a cam surface within the receiving bore for the lock pin carried by the locker compartment door. The pin is grooved so that after the plunger has been cammed aside, the plunger may seat within the groove and lock the door. Unlocking is effected by energizing the solenoid to withdraw its plunger from the groove.

Other and further features of this invention will be apparent as this description proceeds.

BRIEF DESCRIPTION OF THE DRAWING FIGURES

Figure 5A:
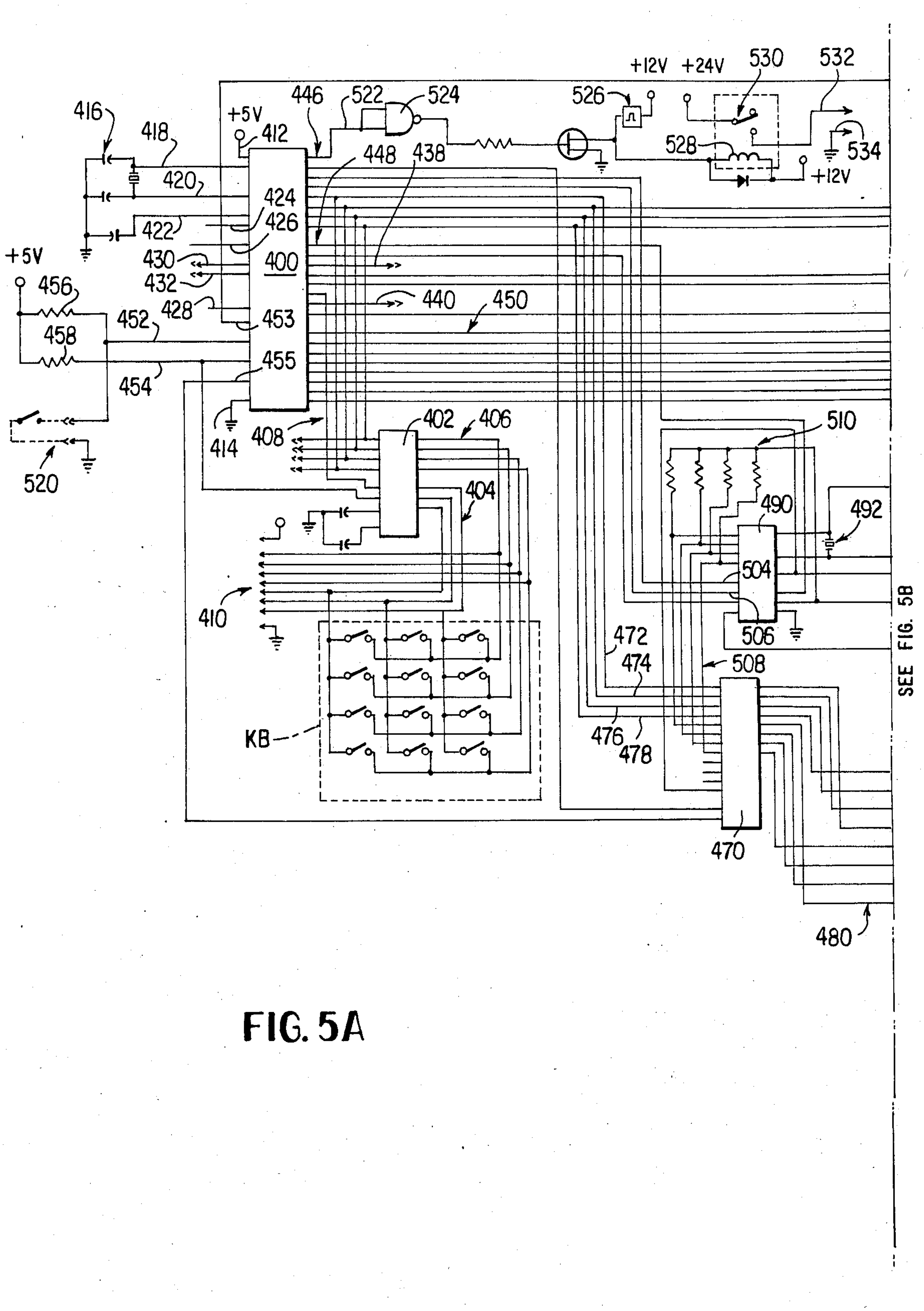
Figure 5B:
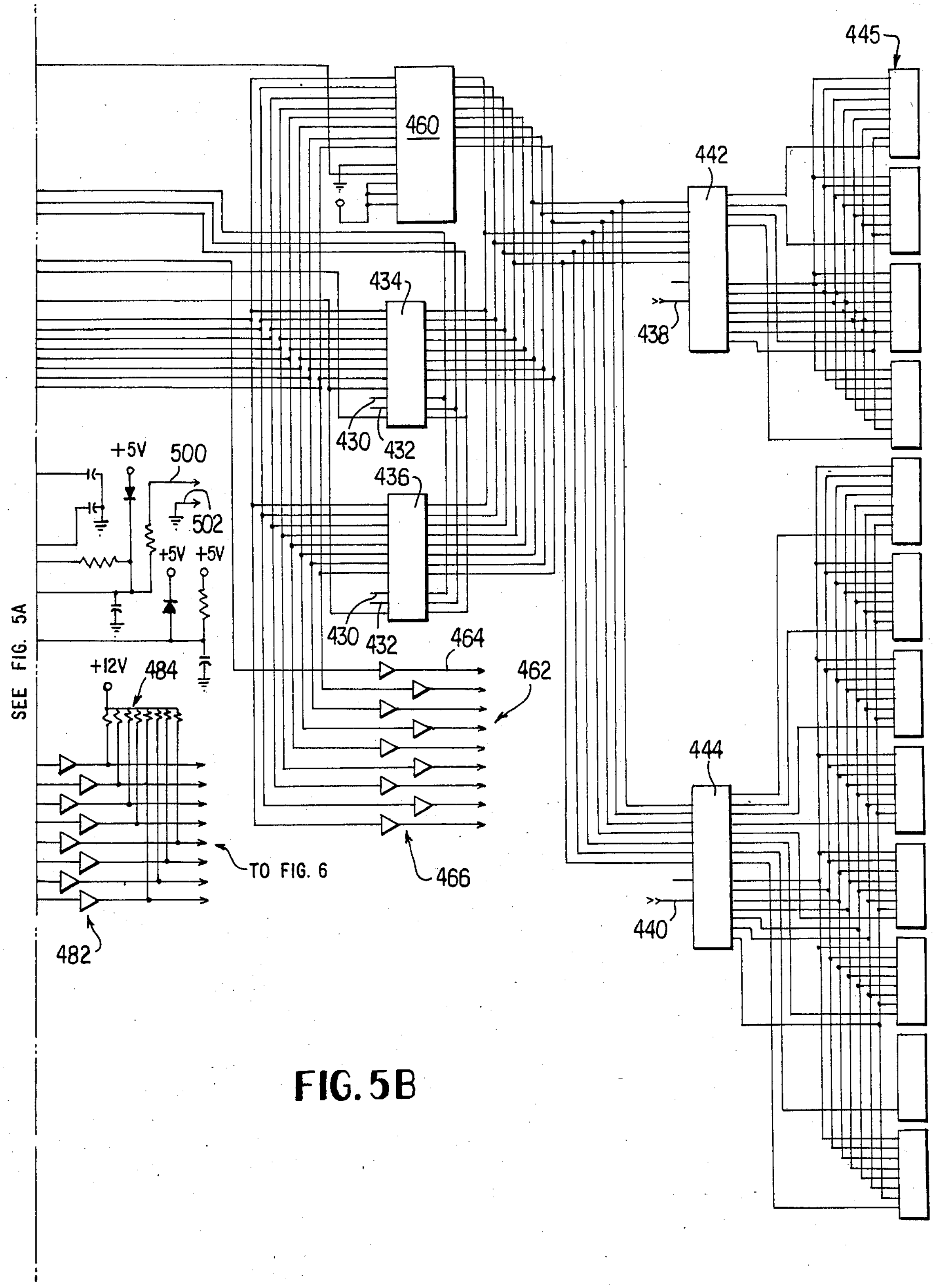
Figure 6:
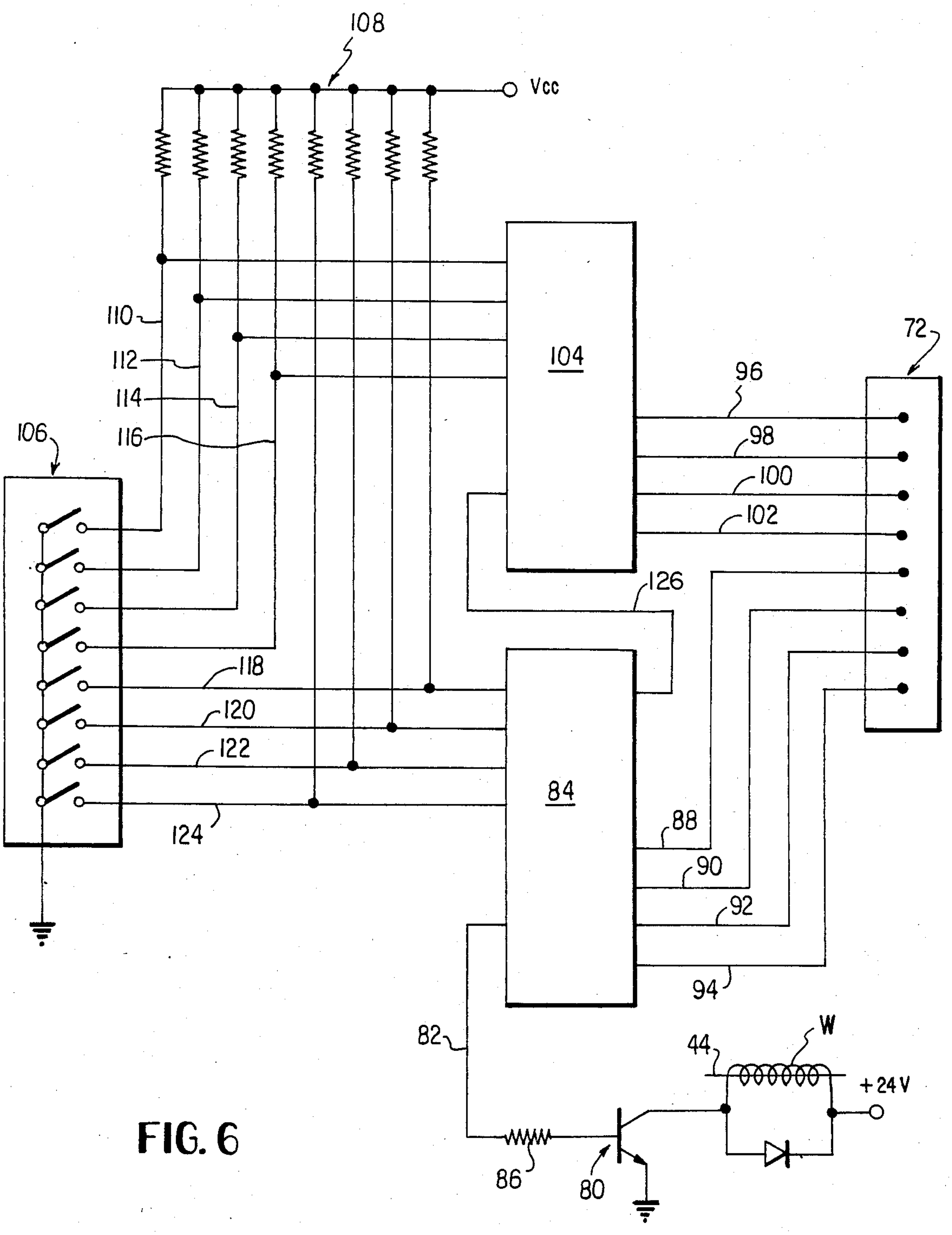
Figure 7:
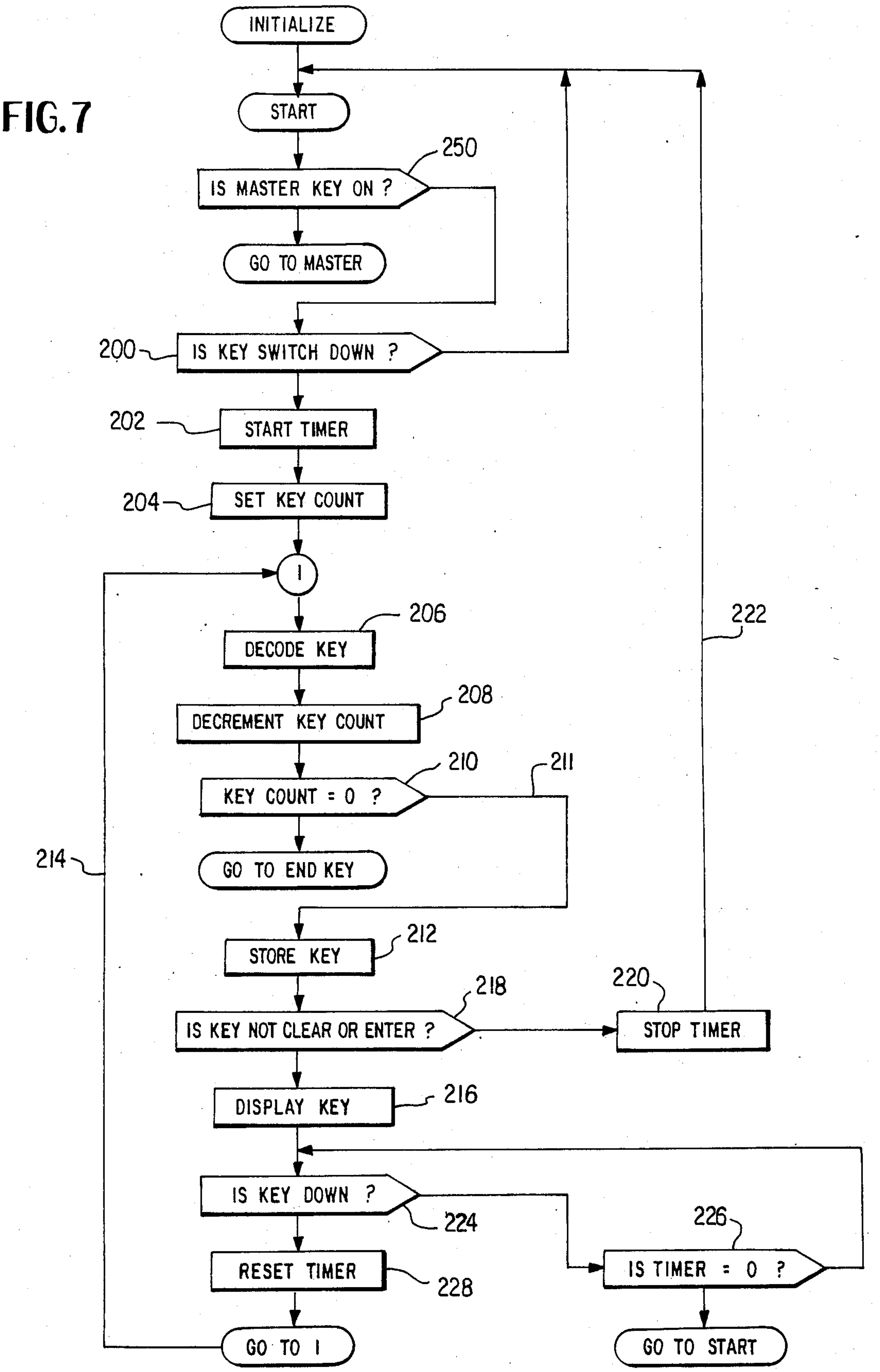
Figure 8:
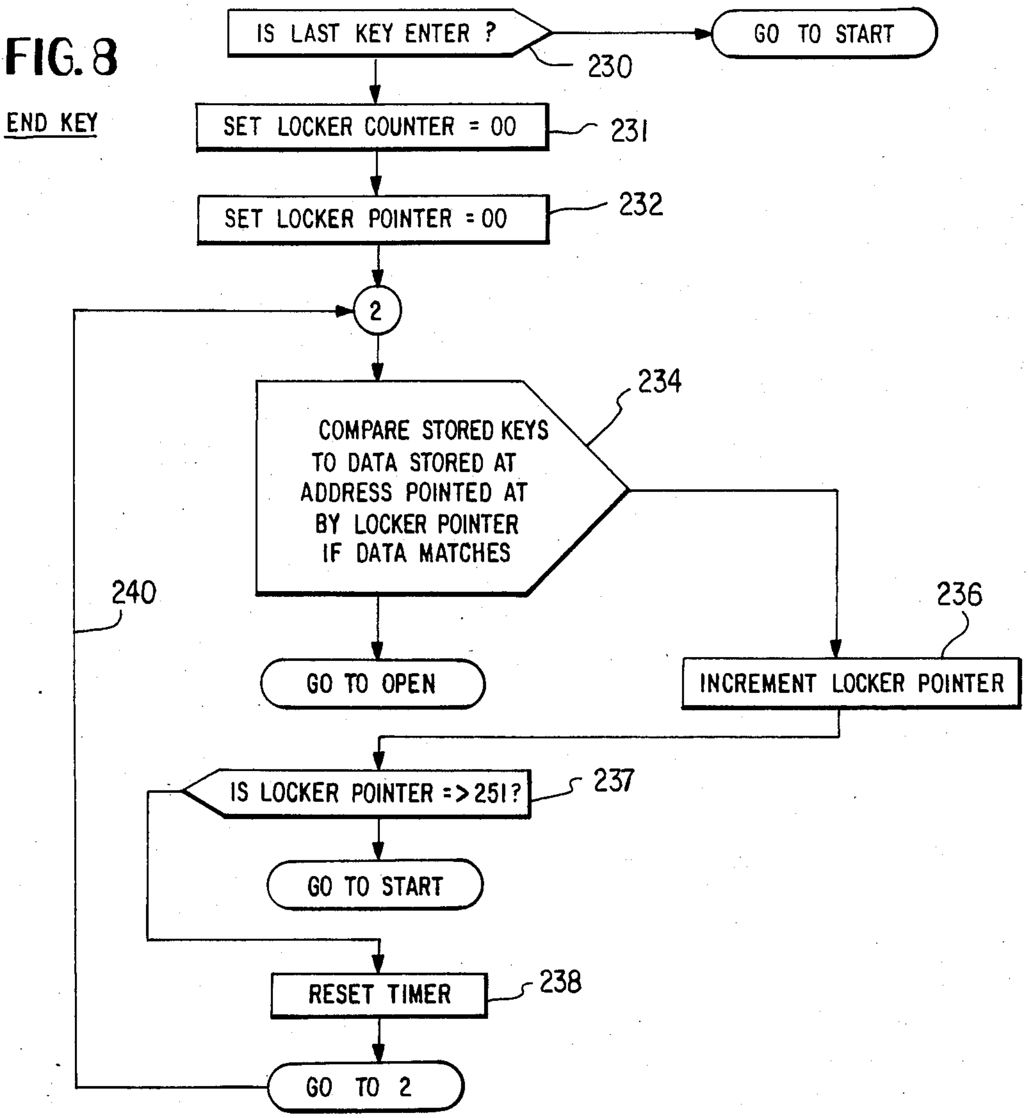
Figure 9:
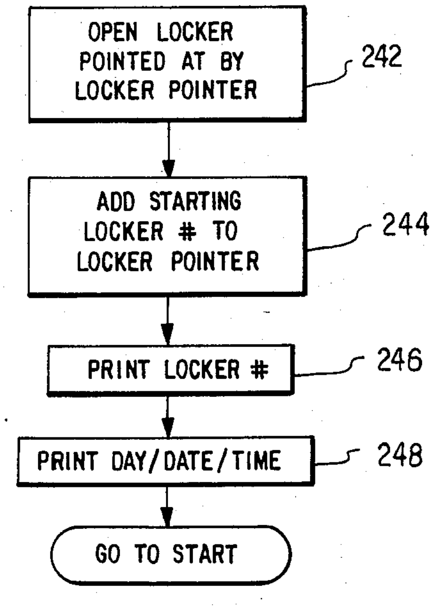
Figure 10:
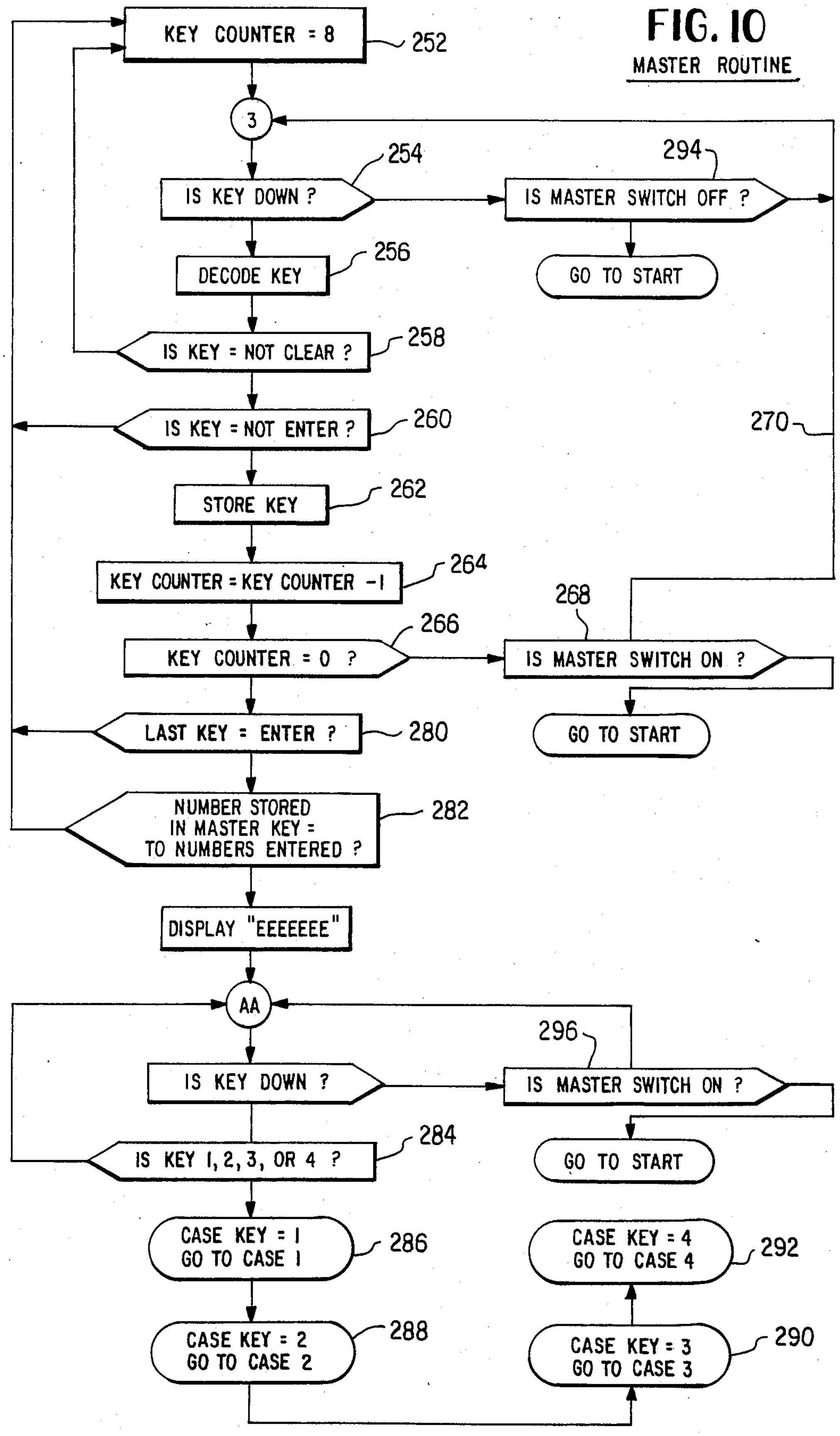
Figure 11:
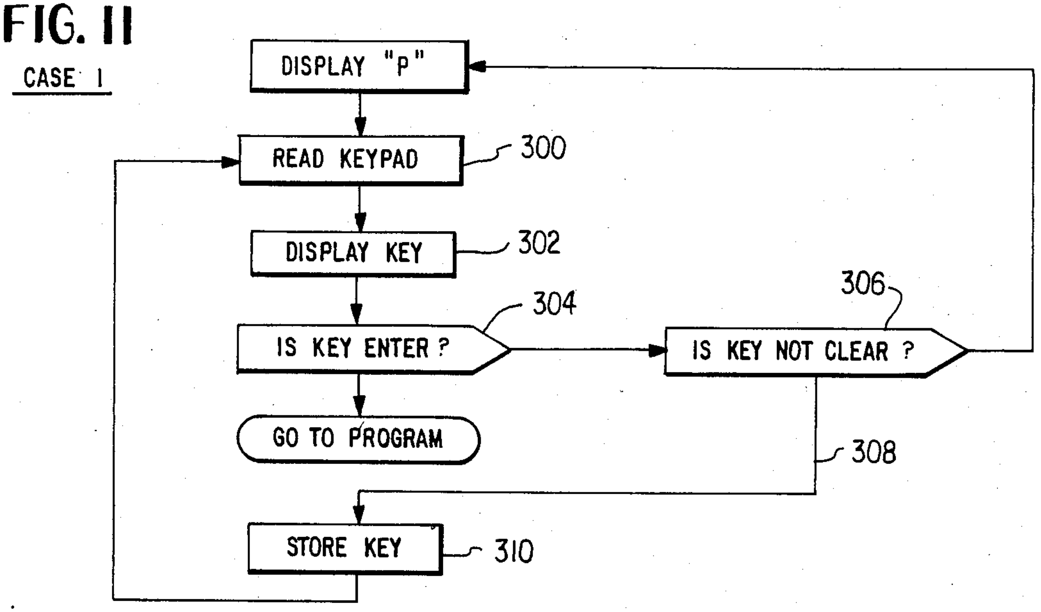
Figure 12:
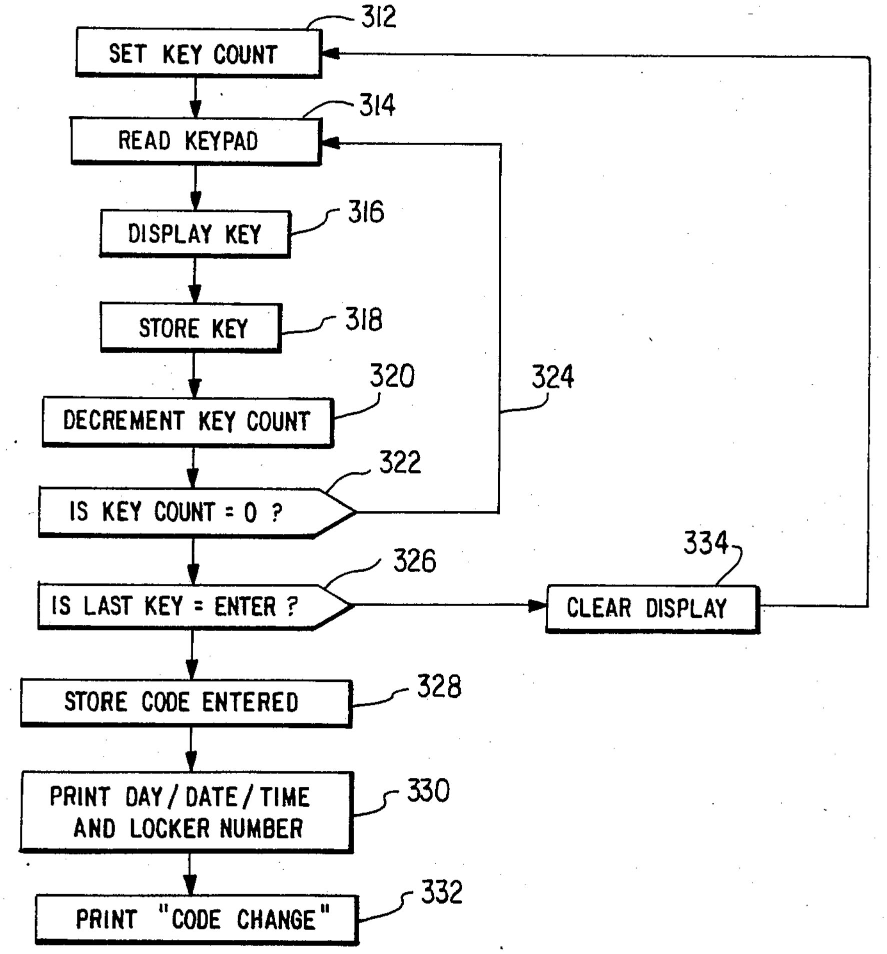

FIG. 5 shown as a composite of FIGS. 5A and 5B, is an electrical diagram of the console circuit means;

FIG. 6 is an electrical diagram of the additional circuit means associated with the lock means;

FIG. 7 is a flow chart of an initial routine;

FIG. 8 is a flow chart of an "end keypad" routine;

FIG. 9 is a flow chart of an "open" routine;

FIG. 10 is a flow chart of a "master" routine;

FIG. 11 is a flow chart of the "case 1" routine;

FIG. 12 is a flow chart of the "program" routine;

FIG. 13 is a flow chart of the "case 2" routine;

FIG. 14 is a flow chart of the "case 3" routine; and

FIG. 15 is a flow chart of the "case 4" routine.

DETAILED DESCRIPTION OF THE INVENTION

Figure 1:
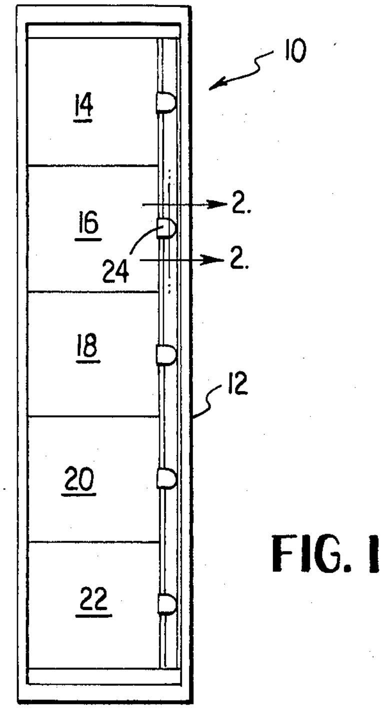
FIG. 1 is an elevational view of a locker compartment bank in accord with this invention.

As shown in FIG. 1, a compartment or locker compartment module of this invention is illustrated at 10 and includes a cabinet 12 having, in this case, five locker compartments with associated doors 14, 16, 18, 20, and 22. This type of module is conventional and, as is well known, may include a key-controlled main door which mounts all of the individual doors 14–22 and, also, a rear door (not shown) through which access to all of the locker compartments may be had. As is also well known, a series of these modules may be arranged side-by-side to form a wall or separation between an access area and a secure area. Such an arrangement will allow front or rear loading of material in selected compartments. Thus, for example, secure material may be loaded into a particular compartment usually from the secure area and a person or persons authorized to have access to that material may gain access thereto from the opposite side through the requisite door.

To gain access, the keyboard KB (see FIG. 5A) of a console (not shown) must be keyed with the correct multiple digit user code assigned to the compartment in question.

Figure 3:
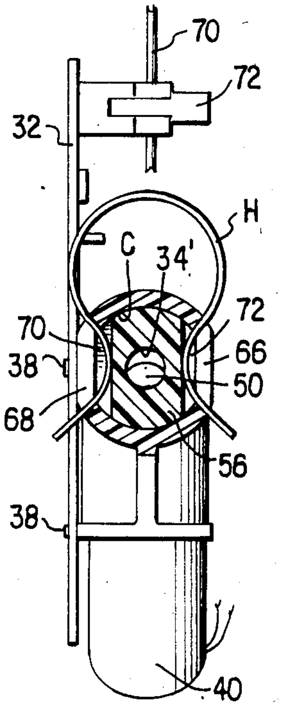
FIG. 3 is a section taken along the plane of section line 3—3 in FIG. 2.
Figure 2:
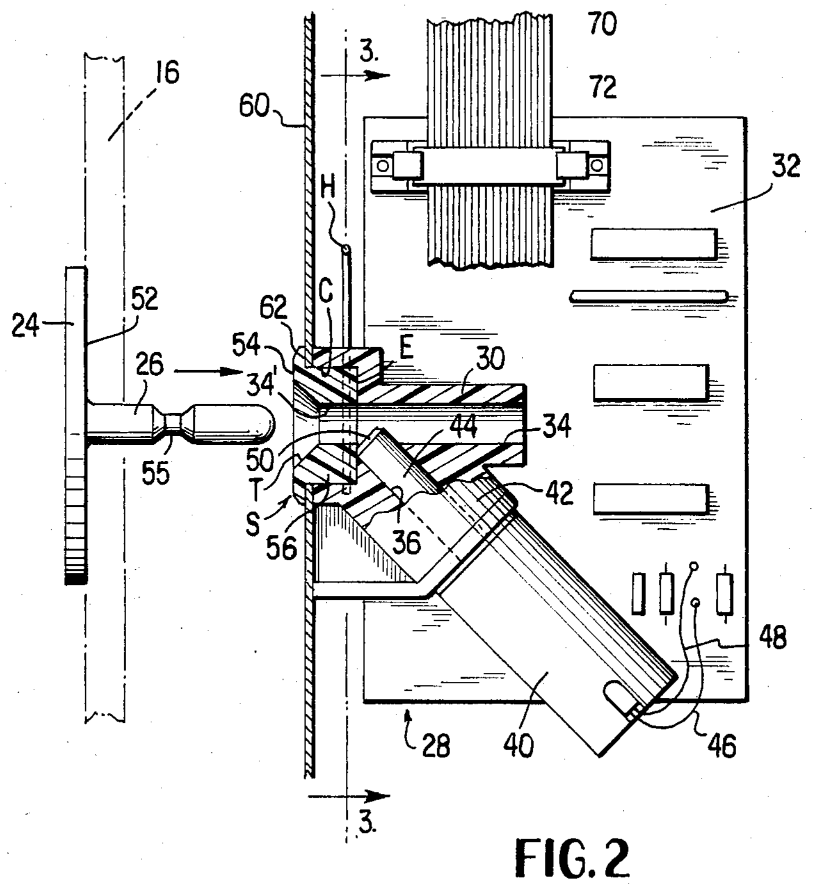
FIG. 2 is an enlarged section taken on section line 2—2 in FIG. 1.

As shown in FIG. 2, each door such as 16 includes a laterally projecting flange or ear 24 having a locking pin 26 extending therefrom. Each door is provided with an associated lock means 28 which includes the lock housing 30 and the printed circuit board 32 on which components of the additional circuit means (see FIG. 6) are mounted. The housing 30 is provided with the receiving bore 34 into which the locking pin 26 projects when the door is closed, and with the plunger bore 36 which intersects the bore 34 at an acute angle, preferably 45°. The housing 30 is provided with a plurality of protruding stubs 38 which project through suitable holes in the printed circuit board 32 and which are staked in place as by heating to swage these stubs so as to secure the board 32 to the housing as shown in FIG. 3. As shown, the housing is made preferably of synthetic resinous material which allows ease of staking the housing to the board as described.

A solenoid 40 is carried by the acute extension 42 of the housing 30 in coaxial relation to the plunger bore 36 so that the plunger 44 of the solenoid reciprocates within the plunger bore. The plunger 44 is spring-urged to the projected position shown in FIGS. 2 and 3 until it seats against the inner end face E of the sleeve S received in the counterbore C in the housing. The sleeve S is provided with an entrance bore 34' which is coaxial with the bore 34 and is also provided with a tapered entrance portion T for the nose of the pin 26, as will be evident. When the solenoid is energized through the leads 46 and 48 under control of the additional circuit means shown in FIG. 6, the plunger 44 is retracted and withdrawn from its normal position projecting into the receiving bore 34.

The end face 50 of the plunger 44 is flat and is slightly tapered as shown to seat well against the inner end face E of the retainer sleeve S and provides an effective cam surface for the pin 26 when it enters the bore 34, thus camming the plunger 44 into the plunger bore 36 and allowing the pin to penetrate into the receiving bore 34 until the face 52 of the flange 24 is seated or almost seated against the outer face 54 of the retainer sleeve S. The circumferential groove 55 in the pin 26 allows the plunger 44 to assume its normally projected position and thereby lock the door. It should be noted at this point that the mounting plate portion 24 is so mounted to the door 16 as to allow the pin 26 to float sufficiently with respect to the door 16 as to accommodate for the arcuate closing motion of the door and pin 26 while still allowing the pin to enter and align itself with the bore 34. Any suitable resilient mounting arrangement for the plate/pin assembly may be used for this purpose.

The retainer sleeve S is provided with a reduced body portion 56 which is of non-circular cross-section and penetrates through an opening of like shape in the front panel 60 of the cabinet 12. Thus, the inner side of the annular lip 62 of the sleeve S seats against the front face of the panel 60 whereas the forward face of the housing 30 seats against the rear face of the panel 60 so that the panel is sandwiched between the sleeve S and the housing 30. The reduced body portion 56 of the sleeve is slid into the counterbore C in the housing and the housing is provided with slots 66 and 68 aligning with slots 70 and 72 in the body portion 56 when the panel 60 is sandwiched as aforesaid. To retain the sandwiched condition, the hairpin spring clip H is snapped into the aligned slots 68, 70 and 66, 72, which slots are of widths substantially the same as the thickness of the wire from which the spring clip H is formed.

Figure 4:
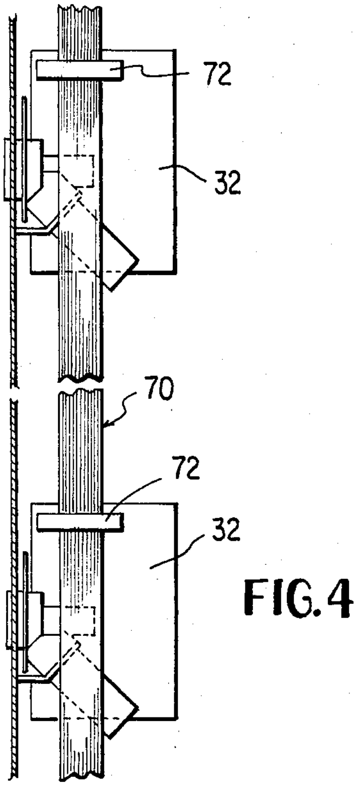
FIG. 4 is a partial section similar to FIG. 2 but showing the simple connection among lock means.

It will be noted that with the arrangement as described, a simple mounting for the locking means is provided and, as well, the printed circuit board 32 is likewise mounted. Also, the printed circuit board 32 is mounted in a favorable position so that the various boards of a module, as shown in FIG. 4 are in vertical alignment so that the flat conductor 70 may be run easily to service all of the locking means as hereinafter described. To this end, it will be noted that each printed circuit board 32 is provided with a conventional two-part connector 72 which establishes electrical contact with the wires of the conductor 70 and thereby services the requisite lines of the circuit board 32.

Details of the additional circuit means which are incorporated on the printed circuit boards 32 is illustrated in FIG. 6. As shown therein, the solenoid winding W is actuated when the NPN transistor 80 is turned on. The plunger 44 is then retracted and the associated door is opened. The base of the transistor is connected to the output line 82 of the comparator unit 84 through the resistor 86. The input lines 88, 90, 92 and 94 from the connector 72 are fed as inputs to the comparator 84 whereas the lines 96, 98, 100 and 102 are fed as inputs to another comparator 104. Both of these comparators are IC chips of the type 74C85. A shunt unit 106 which may simply be a DIP switch assembly is programmed for each lock means so that the proper combination of shunts thereof is made uniquely to identify the compartment associated with that lock means. The resistor net 108 assures a logic "1" when a corresponding shunt is open, otherwise the relevant signal is a logic "0". Thus, the four lines 110, 112, 114 and 116 which are applied to the comparator 104 and the four lines 118, 120, 122 and 124 applied to the comparator 84 digitally represent one of a total of two hundred and fifty six different compartments which may be accessed. Of course, a greater number of compartments may be accommodated by increasing the number of lines to appropriate comparator means of the additional lock means. If the programmed or fixed identity number of the compartment represented on the lines from the shunt unit 106 corresponds with the identity number of the compartment present as input data to all lock means on the lines of the common conductor 70, i.e., if the logic levels of the respective inputs 96–102 are the same as the logic levels of the shunt inputs 110–116 and the logic levels of the respective inputs 88–94 are the same as the logic levels of the shunt inputs 118–124 for the lock means in question, the comparator 104 provides an output on the line 126 to the comparator 84 and the comparator 84 provides the output on the line 82 which turns the transistor 80 on to energize the solenoid winding W of the relevant lock means in question.

Operation of the system will be apparent from the various flow charts of FIGS. 7–15. FIG. 7 illustrates the initial routine which awaits keyboard input from the person wishing access. If that person is not a management person, no "master key" is available to him to operate the console switch to branch the routine to route to the routine of FIG. 10, hereinafter described. Thus, the first keypad of the keyboard which is depressed is the first symbol of the access user code assigned to a user and as soon as that symbol is entered, the "yes" logic at 200 starts the internal timer as indicated at 202. For the present system, this "user" code is seven digits although it will be understood that a greater or lesser number of digits may be employed. Thus, the keypad count set at 204 is seven. The "no" logic at 200 merely loops the routine back to "start" awaiting the depression of the first keypad for the first symbol of the user code.

After the first keypad is depressed, the symbol is decoded at 206 and the keypad count is decremented at 208 and since the keypad count is not yet zero the logic at 210 instructs, as at 211, the keypad data input to be stored as indicated at 212. Thereafter, if everything is normal, the routine loops at 214 to await the next keypad input. Eventually, the successive data inputs for the seven digit user code are successively stored at 212 before going to the "end keypad" routine of FIG. 8. Thus, for each code digit data entry the logic passes from 210 to 212 and ultimately back to 206 as indicated by the line 214.

Since two of the keypads are "clear" and "enter" data inputs, the user may at any time effect "clear" and return to start if the display as effected at 216 indicates that an incorrect keypad was depressed. This logic is performed at 218 and if either the "clear" keypad is depressed or if the "enter" keypad is depressed too soon, the timer is stopped as indicated at 220 and the loop returns as indicated at the line 222 to start. The logic at 224 is provided to prevent user access if too long is taken between keypad depressions. Thus, the logic at 224 loops waiting for the next keypad depression so long as the internal timer has not timed out, but if the timer does time out, the "yes" logic at 226 returns the routine to start. However, if the next keypad is depressed in time, the timer is reset at 228 and the loop returns as indicated by the line 214.

When the seventh digit of the user code has been entered, the keypad count is equal to zero and the logic at 210 advances to the routine of FIG. 8, awaiting an eighth keypad selection. For the eighth selection the user should depress the "enter" keypad and if such keypad is depressed, the logic at 231 sets the locker counter to zero and at 232 sets the locker pointer also to zero, otherwise the routine loops to start. The locker counter and the locker pointer are internal and the routine of FIG. 8 is for the purpose of comparing the data stored during the operation of the routine of FIG. 7 with data stored in various memory locations of the console circuit means. This comparison is indicated at 234 where, if no comparison results, causes the locker pointer to increment by one as indicated at 236 and if the locker pointer has not achieved a count of two hundred and fifty one, as indicated at 237, the timer is reset as indicated at 238 and the routine loops as indicated at 240 for another comparison, and so on. When comparison indicates that the stored data corresponds with that stored in the memory location indicated by the locker pointer, the routine of FIG. 8 advances to the routine of FIG. 9.

In FIG. 9, the locker to which the locker pointer was last pointing in the routine of FIG. 8 is opened, the starting locker number is added to the locker pointer number, as indicated respectively at 242 and 244, and the locker number as well as the day, date and time are printed as indicated at 246 and 248 to effect the audit trail. As noted before, the system is designed to accommodate a basic total of two hundred and fifty six compartments under control of one keyboard KB. However, as is noted from the logic at 237 in FIG. 8, the actual number of compartments is restricted to two hundred and fifty. Thus, if more than this number of compartments is to be used, a second keyboard KB (or more if needed) is employed to effect access to the second bank of compartments. In the event that a second bank of compartments is employed, a starting locker number must be added to the locker pointer number to accommodate these additional compartments (e.g., compartments #251–500, etc.). For the second module associated with the second keyboard, a starting locker number of two hundred and fifty one must be entered (FIG. 15) so that the audit trail printed in accord with FIG. 9 is correct as to the locker or compartment which was accessed.

Returning to FIG. 7, if management desires to branch from the user routine of that Figure, the "master key" must be used so that the logic at 250 responds to the first keypad data entry made whereupon the master routine of FIG. 10 is accessed. When this access is made, the keypad counter is set to eight as indicated at 252 and the routine then awaits the next keypad data entry at 254. When the first entry of the master code is made, it is decoded as at 256 and after the logic decisions at 258 and 260 are answered "yes", the information is stored as indicated at 262, the keypad count set at 252 is decremented by one as at 264 and until the ninth keypad input is entered, the loop passes to the logic decision at 268 where, if the master switch has not in the meantime been turned off, it continues back as at 270 to await the next keyboard input. After the eighth keyboard entry is made, the keypad counter has been decremented to one and if the "enter" keypad is then depressed, the decision at 264 decrements the counter to zero so that in turn the decision at 266 changes the route to the decision at 280. If, indeed, the last keyboard entry was the "enter" keypad, the decision at 282 determines whether the master code entered was correct. If so, the display displays a series of characters or numbers which mask the master code, in the case illustrated, by displaying a series of the letter E. The person entering the master code has access to any one of four different routines, designated as case 1 (FIG. 11), case 2 (FIG. 13), case 3 (FIG. 14) or case 4 (FIG. 15). The selection of the desired routine is made by depressing the keyboard keypad corresponding to the routine desired. The logic at 284 loops the routine until one of the correct keypads is depressed and, dependent upon which keypad is selected, one of the four further routines is selected as indicated respectively at 286, 288, 290 or 292.

The logic at 294 allows the master code routine of FIG. 10 to loop awaiting a keypad data entry unless the master switch is turned off in which case, the routine returns to that of FIG. 7. Likewise, if the master switch is turned off during selection of one of the cases, the logic decision at 296 loops to the initial routine of FIG. 7. This is also the case when looping for the master code input as indicated by the logic at 268. If, during the master code sequence, the "enter" keypad is prematurely depressed, the logic decision at 260 sets the keypad counter to the count of eight and the master keypad or code input must again be initiated. Again, if the keyboard entry after the master code has been completed is not the "enter" keypad or if the master code was not entered correctly, the keypad counter is reset to the eight count and the master code sequence must be started again.

Selection of the routine of FIG. 11 is used to gain entry to the routine of FIG. 12 by means of which the user code assigned to a particular compartment may be changed. In FIG. 11, entry to that routine is identified by the letter p on the display. In this routine, the compartment number itself is entered into the keyboard, i.e., "1", "2", etc., rather than a user code. The logic at 300 reads the digit entered, the logic at 302 displays the digit entry and if the input is neither the "enter" keypad nor the "clear" keypad as decided at 304 or 306, the routine proceeds as indicated at 308 to store the data as at 310 and loops back awaiting the next input. When the compartment number has been entered, the "enter" keypad is depressed and the program routine of FIG. 12 is entered.

In FIG. 12, the keypad entry count is set to six at the logic 312 and seven successive keypad entries are read as at 314 and the keypad entry is displayed as indicated at 316, stored as indicated at 318, the keypad count is decremented as at 320 and at 322 the decision is made whether to loop as at 324 awaiting the next keypad entry or to proceed to the logic 326. The keypad count decrements to zero after the seventh digit of the new user code for the compartment selected in the FIG. 11 routine has been displayed and stored. The "enter" keypad is then depressed and the logic passes to where the new user code is entered at the memory location corresponding to the selected compartment as indicated at 328. The audit trail is printed to show the day, date and time at which the user code change was made and identifies the user code change by also printing "code change" as shown at 330 and 332. If the last keypad entry is not "enter", the logic decision at 334 clears the display and loops back to reset the keypad count and await the entry of a new user code.

The routine of FIG. 13 is employed to gain direct access to a selected compartment through use of the master code. When this routine is entered, the first digit of the display is displayed as the letter L. This routine is abbreviated in the Figure for simplicity since it is similar to that of FIG. 11. Thus, only the reading of one keypad is indicated at 350 with no looping shown as in FIG. 11. Nevertheless, looping is effected until the "enter" keypad is depressed, whereupon all of the keypad entries have been displayed sequentially as at 352 and the selected compartment is opened as indicated at 354 and this information is printed on the audit trail as indicated at 356. Then, the system loops back to continue the L display so that any other compartment may be opened, and so on, until the "clear" keypad is depressed.

When the routine of FIG. 14 is entered, the purpose is to set the clock circuit for the day, date, and time printed on the audit trail. This routine allows plural keypad entry to indicate the correct day, date and time which is displayed on the display and then stored as indicated respectively at 360 and 362.

When the routine of FIG. 15 is selected, the purpose is to set the starting locker number and when this routine is entered, the keypad count is set to ten as indicated at 364. The decisions at 366 and 368 allow only the five keypad to elicit response and after this particular keypad has been depressed ten times, the keypad count has been decremented to zero and the logic at 370 displays LP. The logic at 372 allows a starting locker number to be input, whereafter it is stored as indicated at 374 and the display indicates this fact as indicated at 376. Since the assignment of a starting locker number indicates that new lockers or compartments have been added, it is usually the case that the routines of FIGS. 11, 13 or 14 may require access and for that purpose, the entry of the desired case if entered on the keyboard is read as indicated at 380 which accesses the desired routine.

Referring to FIG. 5A, the CPU 400 receives input data from the keyboard KB which is a 3X4 matrix of keypads, through the decoder 402. The three columns of keypads provide output to the decoder over the lines 404 whereas the four rows of keypads provide output over the lines 406 to the decoder, respectively to the X1–X3 and the Y1–Y4 pin inputs thereof. The decoder is a chip of the type 74C922 and the CPU 400 is of the type 8048. The DA-DE pin outputs 408 of the decoder provide respective inputs to ports P20–P23 and P12 (pins 21–24 and 29 of the CPU). The jack connection indicated at 410 is provided for remote keyboard use.

Pin 26 of the CPU is provided with a 5 volt input as indicated at 412 and its pin 7 is grounded as indicated at 414. In addition, CPU pins 2, 3 and 4 are connected to the external crystal circuit 416 respectively at the lines 418, 420 and 422. Pins 5, 6 and 9 at 424, 426 and 428 are not used. The read and write outputs at pins 8 and 10 and indicated at the lines 430 and 432 are shown jack connected for clarity but are connected to the two electrically erasable ROMs 434 and 436 in FIG. 5B, to be discussed later. Likewise, pins 32 and 28 of the CPU 400 are not shown directly connected but their lines 438 and 440 are respectively connected to the two LED drivers 442 and 444 also shown in FIG. 5A. The LED display is indicated at 445.

The eight port lines indicated by the reference character 446 are connected to pins 38, 37, 36, 35, 24, 23, 22 and 21 of the CPU and the eight port lines 448, which include the two lines 438 and 440 previously mentioned, are connected to pins 27–34 (from bottom to top in this group of lines) of the CPU. The bus lines 450 are connected to pins 12–19 (again from bottom to top) of the CPU and to complete the connections used, the lines 452 and 454 are connected from the 5 volt source through the resistors 456 and 458 to pins 1 and 39 of the CPU; the line 453 is connected to pin 11 (ALE) of the CPU; and line 455 is connected to the pin 25 (PAG) of the CPU.

The bus lines 450 are connected to the two ROMs 434 and 436 as shown in FIG. 5B, to the latch 460 (type 8212) and to the jack 462 which provides the input to the printer which produces the audit trail. The strobe line is indicated at 464 and the remaining lines are data lines, all of which include the buffers 466.

Referring back to FIG. 5A, the device 470 is an I/O port expander, type 8243, which receives data from the four lines 472, 474, 476 and 478 of the port lines 446 from the CPU and provides the eight data line output 480 through the bank of buffers 482. These lines are connected to the resistor net 484 to assure that the logic "one" level is at the correct voltage. These lines are then fed to the additional circuit means of FIG. 6 over the common conductors 70 as the data inputs to all of the comparators as previously described.

The device 490 is a clock chip, type 58321, which is programmed from the routine described in conjunction with FIG. 14 to provide the day/date/time data for the audit trail. The external crystal circuit 492 provides a 32.768 Hz input to the pins 15 and 14 of the clock chip and a suitable battery has its positive and negative terminals connected at 500 and 502 as in FIG. 5B in order to preserve the clock information in the case of power outage. The read and write lines for the clock chip are indicated respectively at 504 and 506, respectively pins 3 and 2 of the chip. The data input lines 508 from the expander 470 are connected to the resistor net 510 to assure the proper logic "one" level for these lines, when applicable.

To complete the description of the console circuit means illustrated in FIGS. 5A and 5B, programming for the CPU is illustrated diagrammatically at 520. The CPU line 522 of the port lines 446 is connected to the NAND gate 524 which controls the VN10KM to operate the buzzer 526 which apprises the user of the console that a locker or compartment has been opened, and also energizes the winding 528 of the relay 530 to switch 24 volts onto the line 532. This line as well as the ground line 534 are two of the conductors of the common conductors 70 and enable energization of the lock solenoids.

As noted before, the console circuit is designed to accommodate up to two hundred and fifty six compartments but it will be evident that a greater number may be accommodated simply by increasing the number of digits which address the comparator means of the individual locking means. Of course, this would require an increased number of comparators at each lock means and corresponding increase in other components, as will be evident to those of ordinary skill in the art.

What is claimed is:

1. In a security locking system, a plurality n of compartments each having a door giving access thereto and lock means for locking each door, each lock means being responsive to a different fixed, unique digital code of m bits;

console means for gaining access to said compartments, said console means including console circuit means for accepting a plurality n of different arbitrary mulitiple digit codes in which each arbitrary multiple digit code differs from any fixed, unique digital code to which the lock means are responsive, and for producing a fixed, unique digital code of m bits which electronically opens that particular lock means associated with the particular selected arbitrary multiple digit code; and additional circuit means associated with each lock means for allowing all of said lock means to be connected by common wiring, having at least m conductors where $2^m$ encompasses the number n, to said console means, said additional circuit means including comparator means at each lock means responsive to one of said different fixed, unique digital codes of m bits to open the associated lock means, all of said comparator means being connected to the same m conductors of said common wiring.

2. In a system as defined in claim 1 wherein said additional circuit means includes a printed circuit board associated with the relevant lock means.

3. In a system as defined in claim 2 wherein each lock means comprises a housing attached to said printed circuit board and having a receiving bore therein, a solenoid carried by said housing and having a plunger normally projecting partially into said receiving bore, said additional circuit means including circuitry accessed by a particular fixed, unique code of m bits over said common wiring for energizing said solenoid to withdraw said plunger from said receiving bore.

4. In a system as defined in claim 3 wherein said housing includes a plunger bore intersecting said receiving bore at an acute angle so that said plunger normally projects into said receiving bore beyond the intersection of the bores.

5. In a security system as defined in claim 4 wherein each door includes a projecting locking pin adapted to be received in an associated receiving bore.

6. In a security system as defined in claim 5 wherein the projecting end of said plunger terminates in a substantially flat face so as to present a camming surface which retracts said plunger when an associated locking pin enters said receiving bore.

7. In a security system as defined in claim 6 wherein said locking pin is provided with a groove into which said plunger normally projects.

8. In a system as defined in claim 5 wherein said housing mounts said lock means on the compartment.

9. In a system as defined in claim 8 wherein said housing is provided with a counterbore at the end of said receiving bore, a guide member received in said counterbore, means for releasably holding said guide member in said counterbore, and said guide member and said housing serving to sandwich the compartment therebetween to secure said lock means and the associated printed circuit board thereto.

10. In a system as defined in claim 6 wherein said housing is provided with a counterbore at the end of said receiving bore, a guide member received in said counterbore, means for releasably holding said guide member in said counterbore, and said guide member and said housing serving to sandwich the compartment therebetween to secure said lock means and the associated printed circuit board thereto.

11. In a system as defined in claim 7 wherein said housing is provided with a counterbore at the end of said receiving bore, a guide member received in said counterbore, means for releasably holding said guide member in said counterbore, and said guide member and said housing serving to sandwich the compartment therebetween to secure said lock means and the associated printed circuit board thereto.

12. In a security locking system, a plurality of compartments each having a door giving access thereto and a separate lock means for locking each such door, each lock means having comparator means preset to open the lock means in response to receiving a unique fixed identity code;

console means connected in common with all of the comparator means for gaining access to said compartments, said console means including a keyboard having keypads for producing sequential signals corresponding to multiple digit user codes of m bits and to a multiple digit master code of n bits where n is greater than m, circuit means for accepting the sequential signals produced by the corresponding multiple digit user codes to produce corresponding unique fixed identity signals which are applied simultaneously to all of the comparator means, each of which electronically opens an individual lock means and for accepting the sequential signals produced by the master multiple digit code to produce further signals which electronically allow any of said user codes to be changed whereby effectively to alter the person or persons to whom access to any particular compartment is to be given through said console means without changing the unique fixed identity code corresponding to such particular compartment.

13. In a system as defined in claim 12 wherein the circuit means includes a processor programmed to provide a first routine accessed by said user codes to open a lock means which has been assigned a particular identity code and a second routine accessed by said master code to alter the user code assigned to a particular lock means.

14. In a system as defined in claim 12 wherein said circuit means includes a processor programmed to provide a first routine which may be accessed by said user codes and by said master code to open a selected compartment.

15. The method of controlling access individually to a plurality of locked compartments which comprises the steps of:

entering coded user data at a module to generate a multi-bit signal which uniquely identifies a particular compartment to which a user is qualified to access;

addressing all of said compartments with said multi-bit signal; and comparing said signal at each of said compartments with a multi-bit code uniquely stored at and assigned to such each compartment and unlocking that particular compartment at which the multi-bit signal effects comparison with said multi-bit signal.

16. The method as defined in claim 15 including the step of entering master code data at said module and altering the coded user data necessary to generate the multi-bit signal uniquely identifying a particular compartment.

17. A security system comprising a front wall providing a division between a restricted space and an access space, said front wall facing the access space and presenting a plurality of compartments accessible from the restricted space and each having a front wall door associated therewith, a plurality n of lock means, one associated with each door, for locking its associated door, each lock means including locking circuit means responsive to one of n fixed and unique m bit digital codes for unlocking the associated lock means, common wiring means including at least m conductors connected to each of said locking circuit means for simultaneously addressing all of said locking circuit means with the same m bit code, said number m being great enough so that $2^m$ is greater than said number n, console means having a plurality of keypads for accepting a plurality of different arbitrary sequences of keypad entries in which the number of different arbitrary sequences greatly exceeds the number n, and console circuit means responsive to n selected ones of said different keypad entries for generating on said m conductors said n different m bit digital codes, and said circuit means being responsive to a master sequence of keypad entries, different from any of said arbitrary sequences of keypad entries, for changing a selected arbitrary sequence required to generate any particular fixed and unique m bit digital code assigned to any particular lock means.

18. A security system as defined in claim 17 wherein said console circuit means is responsive to a plurality of keypad entries additive to said master sequence to enter different routines of programming said console means.

19. In a security locking system, a plurality n of compartments each having a door giving access thereto and lock means for locking each door, each lock means being responsive to a different fixed identity number which is a digital code of m bits; console means for gaining access to said compartments, said console means including console circuit means for accepting a plurality n of different user codes assigned to the different compartments and for responding to each selected user code to produce that fixed identity number which electronically opens the particular lock means associated with the user code selected; the improvement comprising additional circuit means associated with each lock means for allowing all of said lock means to be connected by common wiring to said console means; common wiring having at least m conductors, where $2^m$ encompasses the number n of the compartments; and the additional circuit means including comparator means at each lock means preselected to be responsive to that one of said different fixed identity numbers of m bits which opens the associated lock means, all of said comparator means being connected to the same m conductors of said common wiring.

20. In a security locking system as defined in claim 19 wherein the console circuit means accepts a master code, different from any of the user codes, and includes switch means for allowing alteration of the user codes in response to input of the master code.

* * * * *